July 5, 1966 C. M. WISWELL 3,259,061

LITHOGRAPHIC PRINTING PLATES AND METHODS OF PREPARING SAME

Filed March 11, 1964

INVENTOR

Charles M. Wiswell

BY Pierce, Scheffler & Parker

ATTORNEYS

United States Patent Office 3,259,061

Patented July 5, 1966

3,259,061
LITHOGRAPHIC PRINTING PLATES AND METHODS OF PREPARING SAME

Charles M. Wiswell, Westbrook, Maine, assignor to S. D. Warren Company, Boston, Mass., a corporation of Massachusetts Filed Mar. 11, 1964, Ser. No. 351,125
8 Claims. (Cl. 101—149.2)

The present invention relates to methods for imaging lithographic printing plates and to plates so imaged.

This application is a continuation-in-part of my application, Ser. No. 212,421, filed July 25, 1962.

Frequently it is desired to make lithographic copies of printed or otherwise depicted originals. There are various photographic processes for accomplishing this end. Some of these processes however are time consuming, and most of them require use of relatively expensive photosensitized sheet material and photographic apparatus.

The present invention provides a simple and rapid method for copying an original image without the use of photosensitive material and photographic apparatus. The method comprises providing a paper sheet bearing a surface layer of "delayed-tack" thermoplastic resin and plasticized composition, placing the sheet face-to-face and adjacent to the original image to be copied, irradiating the original image with infra-red rays until said original image has absorbed sufficient heat to melt and render tacky, an inverted but corresponding image in the resinous layer, removing the sheet containing said tacky resinous image from adjacent the original image and pressing said tacky image with or without cooling to below the initial fusion temperature of said composition momentarily into contact with the surface of a lithographic printing plate, whereby at least part of said tacky resinous image is transferred to said plate in non-inverted, original form so that the plate can subsequently be inked for printing. The long period of tackiness of the "delayed-tack" composition allows time for the plate-maker to examine the inverted image for imperfection with or without exposure to the atmosphere before he transfers it to the plate.

Accordingly it is an object of this invention to provide a simple two-step process for imaging lithographic plates from printed or otherwise depicted originals.

It is a further object of this invention to provide a method for imaging lithographic plates by use of "delayed-tack" resinous compositions.

It is a still further object of this invention to provide a simple two-step process for imaging lithographic plates using "delayed-tack" resinous compositions which allow liberal time sequences with cooling to room temperature in the carrying out of said two-step process.

"Delayed-tack" or "sustained-tack" resinous coatings are thermoplastic resinous coatings which are normally hard and non-tacky at room temperature, but which, upon being activated by heat to a tacky condition and subsequently cooled to room temperature, thereafter remain tacky for considerable periods of time varying from at least thirty seconds to several days or more depending upon the particular composition involved.

Delayed-tack coatings are well known. A simple coating of this type is a mixture of discrete particles of resin such as indene resin or esterified resin and discrete particles of crystalline plasticizer such as diphenyl phthalate or N-cyclohexyl paratoluene sulfonamide. The particles are bound together and to a supporting base by a compatible binder such as a styrene-butadiene copolymer. Generally speaking, the crystalline plasticizer component of the mixture is in excess of the resin component.

The property of delayed tackiness in the once heat-activated mixture is apparently due to supercooling of the melted crystalline plasticizer, which super-cooling is prolonged by the increased viscosity imparted by the resin constituent.

Papers coated with layers of such delayed-tack resinous coatings are available commercially and are in quite wide use for labels to be affixed to various objects. Coatings of this nature are described in various U.S. patents, e.g. Nos. 2,462,029; 2,608,542; 2,678,284; and 2,885,306. Such commercial papers that are of light color and of moderate thickness (e.g. in the approximate weight range of 45 to 90 grams per square meter) can be used in carrying out the invention.

Alternatively there can be prepared for specific use in carrying out the invention paper coated with the selected delayed-tack coating, in which case there will preferably be used a light weight sheet of white paper without mineral coating or mineral filler, which sheet bears on one side about 15 to 30 grams per square meter of the delayed-tack coating.

There are literally hundreds of usable delayed-tack compositions. Since they are all oleophilic and they all have high adherent properties, any of them can be expected to give operable results when used according to the invention.

A typical paper product that has been found usable is a sheet of label paper having on one side 20 grams per square meter of coating of the following composition:

| | Parts by weight dry |
|---|---|
| Fusion product: | |
| Diphenyl phthalate | 72 |
| Para indene resin | 6 |
| Adduct of maleic anhydride and a pentaerythritol ester of rosin | 7 |
| Binder: | |
| Polystyrene (added as a 40% emulsion) | 7.5 |
| Styrene-butadiene copolymer (added as 48% solids latex) | 7.5 |
| Water to make solids content 49%. | |

For coating paper with the preceeding composition, an intimate fusion is made of the diphenyl phthalate, para indene resin and maleic anhydride-pentaerythritol ester adduct. This is brought about by blending these materials together while at the same time elevating the temperature to 300° F., so that a molten mass is formed, followed by rapid cooling and constant stirring to about 130° F. The still liquid mass is then spread on a cold metal slab where it is allowed to solidify. This solid mass is reduced to a powder in a hammer mill, and the powdered resinous compositions then dispersed in a slightly alkaline aqueous medium containing a mixture of the polystyrene emulsion and the styrene-butadiene copolymer latex used as adhesive or binder. The resulting coating composition can be applied by any of the known coating methods. In the coating composition each solid, resinous particle remains discrete while the adhesive binds them all together and to a suitable base selected for coating.

The commercial label papers usually have one side highly finished to provide a good printing surface. Though such papers are usable according to the invention, it is obvious that the invention does not require use of a paper of printing quality. Any thin sheet of paper, having reasonably good strength and permeability to infrared radiation, will serve as a satisfactory base for the delayed-tack coating to be used in the practice of this invention.

Physical aspects of the invention can be realized with reference to FIGURES 1, 2 and 3 in which.

Figure 1:
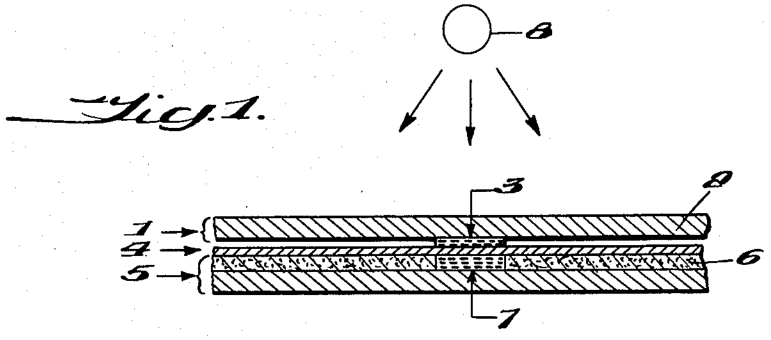
FIG. 1 is an arrangement for irradiation of an image-bearing original and heat-activation of a delayed-tack coated sheet, in which the said original is super-imposed over the delayed-tack coated sheet.
Figure 2:
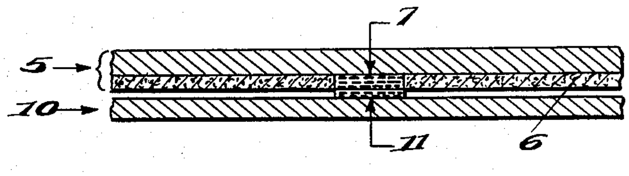
FIG. 2 is an arrangement for transfer of the heat-activated delayed-tack image to a lithographic plate.

As shown in FIG. 1, an image-bearing original 1, comprised of a base sheet 2 bearing a heat-absorptive image 3 on its surface, is placed in direct face-to-face contact with the coated side 6 of a delayed-tack coated sheet 5. If contamination of the original 1 must be avoided, a thin slip sheet 4 is placed between the original 1 and the delayed-tack coated sheet 5. This arrangement is then irradiated by an infra-red lamp 8, until the image 3 on the original 1 has absorbed sufficient heat to produce a corresponding tacky inverted image 7 in the delayed-tack coating 6. The sheets are then separated and as shown in FIG. 2, transfer is effected by evenly placing the delayed-tack coated sheet 5 in direct face-to-face contact with the active surface of a lithographic master 10, so that a portion 11 of the tacky image 7, splits and transfers to the lithographic master 10. As indicated above this transfer can be effected with or without a cooling of the delayed-tack coating below the initial fusion temperature of the delayed-tack coating composition. After separation of the two sheets, the lithographic master 10 is ready for inking and printing.

Figure 3:
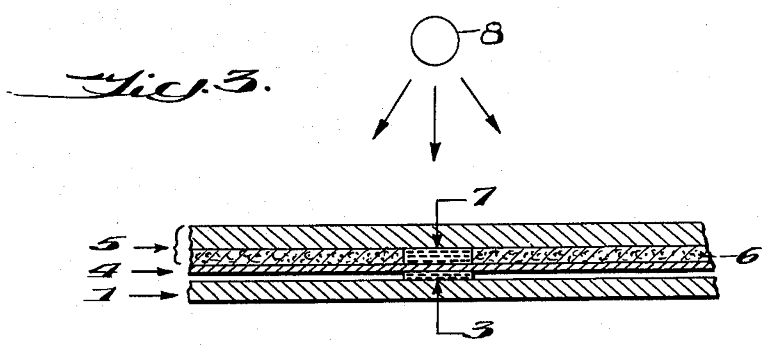
FIG. 3 is an arrangement for irradiation, similar to FIG. 1, in which the delayed-tack coated sheet is superimposed over the original.

FIG. 3 represents an arrangement that is slightly different from FIG. 1. Irradiation 8 passes first through the delayed-tack coated sheet 5 and an optional slip sheet 4 before reaching the image bearing original 1. Irradiation 8 is continued until the image 3 on the original 1 has absorbed sufficient heat to melt a corresponding inverted image 7 in the delayed-tack coating 6. The sheets can then be separated.

The slip sheet described in the preceding figures is used when contamination of the original is objectionable. Of course, where no objections arise concerning contamination of the original, the slip sheet may be omitted. The slip sheet may be any heat pervious material such as paper.

In any thermographic process using irradiation, said irradiation is quite critical. The irradiation should cease as soon as the image areas have been sufficiently heated, lest the background areas likewise be affected by becoming too hot. As a result the imaged areas are not raised much above the melting point of meltable material, which then immediately begins to cool and soon drops below its initial melting temperature. Hence when a melted resinous image is to be transferred, the transfer must be completed very quickly, before the temperature falls, unless the resinous image is of the delayed-tack type as described herein.

When transfers are made automatically by machine, they can be made very quickly, within two seconds or less. Moreover, within the enclosure of a machine, cooling can be avoided to a considerable degree. Hence transfers can and are successfully made by machine with resinous compositions which lack the property of delayed-tack.

When transfer of a melted resinous image is to be made by hand, however, as would be the normal practice in preparing lithographic plates, there results an unavoidable delay between termination of heat application and transfer to the final surface, which delay, occurring as it does at room temperature, permits or rather makes inevitable a considerable decrease in temperature of the image before it is transferred. For this particular use a resinous transfer composition not possessing the property of delayed-tack is useless. It should be realized that in making a transfer by hand one cannot normally expect to complete such a transfer in less than 10 seconds. If the image is to be inspected before transfer is made, as is usually the case, the time required normally will be 30 seconds or more.

The invention can be more fully understood with reference to the following examples. Since preparation of the delayed-tack coatings or the delayed-tack coatings themselves are not part of this invention, in the examples merely the components of the coating as proportionately combined will be stated.

*Example 1*

Bodystock having a basis weight of 90 grams per square meter was coated with the following composition:

| | Parts by weight dry |
|---|---|
| Fusion product A | 95 |
| Fusion product B | 5 |
| Pentaerythritol ester of polymerized rosin acids (added in a solution of caustic soda) | 1.2 |
| Styrene-butadiene copolymer (added as 48% solids latex) | 9 |
| Polystyrene (added as a 40% emulsion) | 9 |

Water to make solids content 48%.

In the preceding composition, fusion product A is the result of fusing and resolidifying the following composition:

| | Parts by weight dry |
|---|---|
| Diphenyl phthalate | 80 |
| Indene resin of M.P. 150° C. | 5 |
| Pentaerythritol ester of rosin | 9 |
| Pentaerythritol ester of polymerized rosin acids | 6 |

and fusion product B is the result of fusing and resolidifying the following composition:

| | Parts by weight dry |
|---|---|
| Indene resin of M.P. 150° C. | 79 |
| Diphenyl phthalate | 15 |
| Pentaerythritol ester of polymerized rosin acids | 6 |

The paper was coated by means of an air knife coater and dried at a temperature below the fusion point of the resinous components. The dry coating weight was 20 grams per square meter.

The coated sheet was then placed in direct face-to-face contact with an image bearing sheet which will be referred to as the original. The arrangement was essentially the same as that illustrated in FIG. 1 except that the slip sheet was omitted. For two seconds infra-red radiation was directed on the back surface of the original. Heat rays were locally absorbed in the imaged areas of the original, which in turn heated corresponding inverted areas in the coated sheet. After two seconds the discrete particles in the coated sheet were melted and the two sheets were separated. After exposure to the atmosphere and cooling to substantially room temperature, the coating having a tacky inverted image was placed in uniform direct face-to-face contact with the active surface of a lithographic master, slight pressure was applied and they were separated. The master had a direct reading oleophilic image on its surface corresponding to the original. The master was then inked and run off on a Multilith Rotary Offset Duplicator and gave satisfactory copies.

*Example 2*

Surface sized body stock having a weight of 42 grams per square meter was coated with the following composition:

| | Parts by weight dry |
|---|---|
| Fusion product C | 85 |
| Pentaerythritol ester of polymerized rosin acids (added as an ammoniacal solution) | 1.2 |
| Styrene-butadiene copolymer (added as 48% solids latex) | 7.5 |
| Polystyrene (added as a 40% emulsion) | 7.5 |

Water to make solids content 48%.

In the preceding composition, fusion product C is the result of fusing and resolidifying the following composition:

| | Parts by weight dry |
|---|---|
| Diphenyl phthalate | 80 |
| Pentaerythritol ester of rosin | 14 |
| Pentaerythritol ester of polymerized rosin acids | 6 |

The coating was applied by means of an air knife coater and subsequently dried at a temperature below the fusion point of the resinous components. Coating weight was determined to be 18 grams per square meter.

The coated sheet so prepared was placed in direct face-to-face contact with an original as illustrated in FIG. 3 except that the slip sheet was omitted. Infra-red rays were applied to the inactive side of the delayed-tack coated sheet for 2 seconds so that sufficient heat was absorbed on the image areas of the original to melt corresponding inverted areas on the delayed-tack coated sheet. After this two second exposure the sheets were separated. The coated sheet had a tacky, inverted image of the original image on its surface. By exposing the tacky imaged sheet to the atmosphere at room temperature for a few seconds and then bringing it face-to-face with a lithographic master, applying slight pressure and subsequently separating them, a direct oleophilic visible image was left on the lithographic master. The master was then inked and run on a Multilith Rotary Offset Duplicator and gave satisfactory copies.

From the foregoing description and examples, it can be seen that the present invention provides for a simple, inexpensive and fast process for imaging lithographic plates from an image bearing original. It is simple in that there is no technical skill involved. Only uniform alignment and a few seconds of irradiation are required to carry out the operation. Dependent on the "delayed-tack" coating selected a reasonable amount of over-exposure is usually tolerable.

Compared to other existing reproducing processes, the economic feasibility of practicing the present invention outweighs the others due to the low price of delayed-tack coated papers and the minimum amount of apparatus required.

This economic feasibility is further emphasized by the fact that the delayed-tack coating in heat-activated image areas has sufficient material and remains sufficiently tacky to provide more than one transfer so that consequently more than one imaged master can be made from one heat-activated sheet if it should be so desired.

The two-step process can be completed in a matter of seconds. Incorrect thermo-exposures can be quickly determined by a fast examination of the activated areas of the delayed-tack coating. Furthermore, if desired, the two-step process allows a time lapse with or without cooling between thermo-exposure and transfer, the amount of time depending upon the delayed-tack composition selected. In this way, a group of thermo-exposures can be done in succession. The exposures can then be set aside allowing the operator to leave his work if necessary, or transferred immediately.

Having thoroughly described and disclosed the preferred embodiments of my invention, what I claim as new and desire to secure by Letters Patent of the United States is:

1. Process which comprises (1) positioning adjacent to and face-to-face with a surface of a sheet bearing a heat-absorptive image upon a less heat-absorptive background, a flexible sheet bearing a layer of "delayed-tack" resinous composition; (2) irradiating said image with infra-red rays until said image has absorbed sufficient heat to soften and render tacky in the "delayed-tack" resinous composition adjacent thereto a corresponding inverted image; (3) cooling said inverted image below the initial fusion temperature of said composition; and (4) positioning said tacky inverted image in face-to-face contact with a lithographic plate to transfer said tacky inverted image to said lithographic plate as a direct oleophilic image.

2. Process according to claim 1 in which said infra-red rays are directed on the unimaged back surface of said heat-absorptive image bearing sheet.

3. Process according to claim 1, in which said infra-red rays are directed on the uncoated back surface of said sheet coated with "delayed-tack" resin composition.

4. The process according to claim 1 in which said "delayed tack" resinous composition, once irradiated, is tacky for at least thirty seconds.

5. The process according to claim 1 wherein a heat pervious slip sheet is placed between said heat absorptive image bearing surface and said flexible sheet bearing a "delayed tack" resinous composition layer.

6. The process according to claim 5 wherein said heat pervious slip sheet is paper.

7. Method of imaging a lithographic printing plate which includes heating until tacky selected areas of a layer of delayed tack resinous coating carried on a support, cooling said coating below the initial fusion temperature thereof, thereafter pressing said coating containing said tacky areas into contact with a lithographic plate and transferring thereto tacky coating from said selected areas, and thereafter applying ink to the areas of transferred tacky coating.

8. A lithographic printing plate made by the process defined in claim 1 and consisting essentially of a lithographic master and an image thereon consisting of a "delayed-tack" resinous composition.

References Cited by the Examiner

UNITED STATES PATENTS

| | | | |
|---|---|---|---|
| 2,503,758 | 4/1950 | Murray. | |
| 2,616,961 | 11/1952 | Groak. | |
| 3,808,777 | 10/1957 | Roshkind ------ | 101—149.2 X |

DAVID KLEIN, *Primary Examiner.*